United States Patent [19]
Funabiki et al.

[11] 4,072,531
[45] Feb. 7, 1978

[54] PLUGGING COMPOSITIONS FOR BLAST FURNACE TAP HOLES

[75] Inventors: Kyohei Funabiki; Tetsuya Tokunaga, both of Fujieda, Japan

[73] Assignee: Sumitomo Durez Company, Ltd., Tokyo, Japan

[21] Appl. No.: 666,290

[22] Filed: Mar. 12, 1976

Related U.S. Application Data

[63] Continuation-in-part of Ser. No. 639,679, Dec. 11, 1975.

[30] Foreign Application Priority Data

Mar. 15, 1975 Japan ............................ 50-30669

[51] Int. Cl.$^2$ ............... C04B 35/02; C04B 35/66; C04B 35/04; C04B 35/66
[52] U.S. Cl. ............................ 106/56; 106/55; 106/58; 106/65; 106/67; 260/38
[58] Field of Search .............. 106/56, 67, 65, 58, 106/55; 260/38

[56] References Cited

U.S. PATENT DOCUMENTS

| | | | |
|---|---|---|---|
| 2,502,498 | 4/1950 | Williamson et al. | 260/38 X |
| 2,820,265 | 1/1958 | Kohl et al. | 164/43 X |
| 2,956,033 | 10/1960 | Apel et al. | 260/38 X |
| 2,956,033 | 10/1960 | Apel et al. | 260/17.5 |
| 3,336,185 | 8/1967 | Helbing | 260/38 X |
| 3,567,807 | 3/1971 | Shannon | 106/56 |
| 3,668,160 | 6/1972 | Horton et al. | 164/43 X |
| 3,689,299 | 9/1972 | Brown et al. | 106/56 X |
| 3,832,426 | 8/1974 | Malthouse et al. | 106/56 X |
| 3,840,485 | 10/1974 | Brown et al. | 106/56 X |

Primary Examiner—Patrick P. Garvin
Assistant Examiner—William G. Wright
Attorney, Agent, or Firm—Peter F. Casella; James F. Mudd; William G. Gosz

[57] ABSTRACT

Plugging compositions for blast furnace tap holes comprising a refractory filler, a wetting agent, and a binder therefor comprising a phenol-aldehyde condensate resin chemically modified by reaction with lignin have a muddy consistancy, and are characterized by enhanced compressive strength at elevated temperatures and increased plasticity at low temperatures as compared to conventional binders.

6 Claims, No Drawings

PLUGGING COMPOSITIONS FOR BLAST FURNACE TAP HOLES

CROSS-REFERENCE TO RELATED APPLICATION

This is a continuation-in-part of copending application Ser. No. 639,679, filed Dec. 11, 1975.

BACKGROUND OF THE INVENTION

The present invention relates to plugging compositions for blast furnace tap holes which are muddy in consistancy and are characterized by containing a phenolic resin chemically modified by reaction with lignin as a binder.

Tar has been previously employed as a binder for such plugging compositions. However, a plug formed from such compositions hardens slowly and has poor bonding strength at high temperature conditions. In addition, compositions containing tar generate a considerable amount of smoke causing serious air contamination problems and occupational health problems.

The substitution of conventional phenolic resins for tar as a binder for plugging compositions has been suggested. The use of such phenolic resins in these compositions is often characterized by a high bonding strength in the low temperature range (i.e., 200° C-400° C) which may cause the material to solidify prematurely in the applicator and make tapping difficult once the plug has been formed. A further disadvantage of conventional phenolic resin binders is their high cost.

The use of phenolic resins chemically modified with lignin and/or molasses as binders for refractory compositions was disclosed in copending application Ser. No. 639,679, wherein it was found that such compositions have superior refractory properties as compared to conventional tar, pitches, ordinary phenolic and furan resins.

SUMMARY OF THE INVENTION

It has now been found that the lignin-modified phenolic resins (hereinafter referred to as "modified phenolic resins") of the present invention are excellent binders for plugging compositions when used, for example, in blast furnace tap holes since such compositions harden rapidly, have adequate and uniform bonding strength over a wide temperature range (i.e., 400° C-1,400° C), and maintain good pliability in the low temperature range. Furthermore, the binders of this invention are less expensive than conventional phenolic resins, and are environmentally more acceptable than tar.

DETAILED DESCRIPTION OF THE INVENTION

The modified phenolic resin binders of the present invention may be prepared by any of the following methods:

(1) Novolak type phenolic resin modified with lignin (typically lignin containing sodium, potassium and/or calcium ions), is obtained by adding from about 5 to about 500 parts by weight of a lignin such as sulfite pulp lignin or kraft pulp lignin (hereinafter referred to as "a lignin") to 100 parts by weight of a phenol such as phenol per se, cresol or other alkyl-substituted phenol having 1 to 4 carbon atoms in the alkyl group (hereinafter such phenol reactants being referred to as "phenol"); then, adding thereto, if desired, up to about 0.9 mole of an aldehyde such as formaldehyde, acetaldehyde, butyraldehyde or furfural (hereinafter referred to as "an aldehyde") per mole of said phenol, heating and reacting the mixture in the presence of an acid catalyst, for example, an organic acid such as common oxalic acid or p-toluenesulfonic acid, an inorganic acid such as hydrochloric acid or sulfuric acid or a "Lewis" acid such as aluminum chloride; and dehydrating the reaction product under atmospheric pressure or reduced pressure to obtain solid resin. To this solid resin may be added about 0.5 to about 20 parts by weight of hexamethylenetetramine by weight of solid resin as hardening agent, if desired, and the resulting mixture may be pulverized to a powder.

(2) A novolak type phenolic resin modified with lignin can also be obtained by reacting a phenol with an aldehyde in the presence of a common acid catalyst, then adding a lignin to the phenolic resin, reacting the mixture together in the presence or absence of a common acid catalyst under heating, and dehydrating the product under atmospheric pressure or reduced pressure. Hexamethylenetetramine may be added to the product as a hardening agent, if desired, and the product can be pulverized to a powder.

(3) A resolic phenolic resin modified with a lignin is obtained by adding from about 5 to about 500 parts by weight of a lignin to 100 parts by weight of a phenol, then adding thereto about 1-3 moles of an aldehyde per mole of said phenol; the mixture is reacted under heating in the presence of a common basic catalyst, for example, an inorganic base such as calcium hydroxide or barium hydroxide or an amine such as ammonia or triethylamine. The product is then dehydrated under reduced pressure to obtain the resin binder.

The aforementioned condensations with lignin are carried out in aqueous media. Generally about 1 to 100 parts by weight of water per 100 parts by weight of the lignin extender reactant are employed. The amount of acid catalyst used is from about 0, preferably about 1, to about 10 parts per 100 parts by weight of the phenolic reactant and the amount of basic catalyst used is from about 1 to about 150 parts per 100 parts by weight of the phenolic reactant.

The refractory fillers which may be used to prepare the plugging compositions of this invention include those generally employed in this art such as clay, alumina, carbon, magnesia, and pyrophyllites, as well as mixtures thereof. The modified phenolic resin will typically be present in the preferred range of from about 5 to about 30 parts by weight per 100 parts by weight of refractory filler.

A wetting agent is added to the mixture of refractory filler and modified phenolic resin to form a muddy, clay-like plugging composition. Suitable wetting agents are generally known in this art and include, by way of illustration, glycols, such as ethylene glycol, diethylene glycol, propylene glycol, polyethylene glycol, or plasticizers, such as dioctyl phthalate or tricresyl phosphate, and the like. The wetting agent is added in an amount sufficient to form a clay-like mass capable of being injected into a blast furnace tap hole by means of a "mud gun", or some such similar applicator used in the art for plugging tap holes. Typically, the wetting agent is present in amounts of from about 0.5 to about 20 parts by weight per 100 parts by weight of refractory filler.

The present invention will be illustrated more concretely by means of the following examples which do not limit the scope of the invention. For example, in accordance with the instant invention, modified phenolic resins can be admixed with conventional novolak resins prior to the addition of refractory material and wetting agent. Parts and percentages in the examples are given by weight unless otherwise indicated.

EXAMPLE

Preparation of Modified Phenolic Resins

Part A. 100 parts of phenol and 300 parts of sulfite pulp lignin were reacted under atmospheric pressure in the presence of sulfuric acid catalyst and heated with continuous elimination of volatile substances up to a maximum temperature of 200° C to obtain a modified phenolic resin with a melting point of 87° C. Ten percent of hexamethylenetetramine was added to said resin and the mixture was crushed. The product was labeled Resin A.

Part B. 100 parts of phenol was added to 37% formalin in an amount of 0.7 mole as formaldehyde with respect to 1 mole of phenol, then reacted for 3 hours at 100° C in the presence of oxalic acid catalyst, thereafter adding 100 parts of sulfite pulp lignin, with sulfuric acid catalyst and dehydrated under reduced pressure to obtain a solid resin with a melting point of 82° C. Two percent of hexamethylenetetramine was added to this resin and the mixture was crushed to obtain a product labeled Resin B. Resin B was further dissolved in an equal amount of ethylene glycol to obtain a product labeled Resin C of a viscosity of 120 poises at 25° C.

Part C. A mixture of 50 parts of phenol, 50 parts of cresol, 200 parts of kraft pulp lignin and 37% formalin in an amount of 0.5 mole as formaldehyde with respect to 1 mole of phenol-cresol mixture was reacted for 5 hours at 100° C in the presence of hydrochloric acid catalyst and then dehydrated to obtain a solid resin of a melting point of 95° C. This resin was crushed to obtain a product labeled Resin D.

Part D. 100 parts of phenol was added to 100 parts of sulfite pulp lignin, and reacted for 3 hours at 120° C. To this mixture was added 37% formalin in an amount of 1.5 mole as formaldehyde with respect to 1 mole of phenol, and reacted for 4 hours at 100° C in the presence of sodium hydroxide catalyst. 50 parts of sulfite pulp lignin was again added thereto, and dehydrated under reduced pressure and diluted with a mixed solvent of ethylene glycol and polyethylene glycol to obtain a liquid product labeled Resin E with a viscosity of 100 poises at 25° C.

Part E. A mixture of 70 parts of phenol, 30 parts of cresol, 50 parts of sulfite pulp lignin and 37% formalin in an amount of 2.5 mole as formaldehyde with respect to 1 mole of phenol-cresol mixture was reacted for 2 hours at 100° C in the presence of potassium hydroxide catalyst, then dehydrated under reduced pressure and diluted with diethylene glycol to obtain a liquid product labeled Resin F with a viscosity of 90 poises at 25° C.

EXAMPLE II

A mixture of 40 parts of alumina, 30 parts of crushed coke, 20 parts of crushed clay and 10 parts of silicon carbide, the grain size of all ingredients previously controlled within coarse to medium, was employed as a refractory filler. The aforementioned modified phenolic resin A, B or D was added to said filler in an amount of 10% with respect to said filler. Then 8% of diethylene glycol with respect to said filler, was added as wetting agent and the mixture was sufficiently kneaded to obtain a muddy mixture. As a comparative example, an ordinary unmodified phenolic resin in powder form was similarly kneaded to obtain a muddy mixture. Also a sample with tar used as a binder in an amount of 20% with respect to the filler of same composition was prepared, but kneading in this case had to be carried out under heating as the tar showed a tendency to solidify at ambient temperature.

The muddy mixtures thus obtained were manually molded into cylindrical pieces of 50 mm dia. × 50 mm, which were subsequently placed in closed refractory containers of 52 mm dia. × 52 mm, sintered for 2 hours at 200°, 400°, 800° or 1,200° C and subjected to testing of compressive strength. The results are summarized in Table 1.

TABLE 1

| | | Present Invention | | | Comparative Examples (Conventional) | |
|---|---|---|---|---|---|---|
| | Binder Sintering | Modified Phenolic Resins | | | Unmodified Phenolic | Liquid |
| | Temp. | A | B | D | Resins | Tar |
| Compressive Strength (kg/cm²) | 200° C | 40 | 19 | 7 | 125 | 9 |
| | 400° C | 118 | 92 | 69 | 100 | 20 |
| | 800° C | 107 | 77 | 66 | 56 | 28 |
| | 1,200° C | 109 | 72 | 61 | 41 | 25 |

The results in Table 1 indicate that the use of the modified phenolic resins of the present invention as binders for plugging materials provides them with a low strength at 200° C and an appropriate and uniform strength in the low to high temperature range (400°–1,200° C), thereby enabling the user to avoid solidification in the applicator and realizing satisfactory plugging and tapping properties. Ordinary phenolic resins used in the comparative examples show rapid solidification at 200° C making them difficult to apply, e.g., such as solidification in the applicator. Also the tar composition, though being free of the problem of solidification in the applicator, generally shows poor strength which is insufficient for plugging and for durability.

In a trail use with a furnace, the plugging material utilizing the binder of the present invention proved, in comparison with the case using conventional tar, to show faster hardening after plugging, and higher durability enabling longer tapping time. Also the absence of voluminous black smoke generation such as encountered in the case of tar was extremely desirable for workshop environment.

EXAMPLE III

Finely powdered magnesia used as a refractory filler, was added with the aforementioned modified phenolic resin C, E or F in an amount of 14% with respect to said filler, and the mixture was sufficiently kneaded to obtain a muddy mixture. As a comparative example an ordinary unmodified phenolic resin in liquid form was similarly kneaded to obtain a muddy mixture. Further, tar was similarly kneaded to obtain a muddy mixture.

The muddy mixtures thus prepared were manually molded into cylindrical pieces of 50 mm dia. × 50 mm, which were subsequently placed in refractory containers of 52 mm dia. × 52 mm, then sintered for 4 hours at 200°, 600°, 1,000° or 1,400° C and subjected to testing of compressive strength. The results are summarized in Table 2.

TABLE 2

|  | Binder Sintering Temp. | Present Invention Modified Phenolic Resins | | | Comparative Examples (Conventional) | |
|---|---|---|---|---|---|---|
|  |  | C | E | F | Unmodified Phenolic Resins | Liquid Tar |
| Compressive Strength (kg/cm²) | 200° C | 25 | 52 | 38 | 219 | 2 |
|  | 600° C | 122 | 147 | 131 | 153 | 88 |
|  | 1,000° C | 115 | 120 | 95 | 89 | 65 |
|  | 1,400° C | 102 | 118 | 92 | 69 | 52 |

The results in Table 2 indicate that, as in Table 1, the modified phenolic resin binders of the present invention provide improved characteristics, in comparison with the comparative examples, when used in plugging compositions.

In a trail use with a furnace, the plugging material utilizing the binder of the present invention showed little solidification in the applicator and significantly facilitated the cleaning of the applicator, in comparison with the case of conventional unmodified phenolic resin binders. In the case of the unmodified phenolic resins, the plugging material solidified in the applicator after use and had to be chipped out.

Further, the plugging material utilizing the binder of the present invention showed satisfactory plugging properties and also a satisfactory tapping time of 4 hours.

The plugging material utilizing unmodified phenolic resin as a binder showed an elevated strength at the furnace wall part of the plugged material (300°–400° C) and could not be taped easily.

The foregoing embodiments are intended to illustrate the invention but not to limit it. Various modifications can be made in the invention without departing from the spirit and scope thereof.

What is claimed is:

1. A blast furnace tap hole plugging composition comprising a condensate resin of a phenol and an aldehyde chemically modified by reaction under heating with a lignin selected from the group consisting of sulfite pulp lignin and kraft pulp lignin, present in an amount of about 5 to about 500 parts by weight per 100 parts by weight of phenol, a refractory filler, and a wetting agent present in an amount of from about 0.5 to about 20 parts by weight per 100 parts by weight of refractory filler, wherein the resin is present in a range of about 5 to about 30 parts by weight per 100 parts by weight of refractory filler.

2. The composition of claim 1 wherein the condensate resin is novolak resin.

3. The composition of claim 1 wherein the condensate resin is a resol resin.

4. The composition of claim 1 wherein the aldehyde reactant is formaldehyde and the phenol reactant is selected from the group consisting of phenol and alkyl phenols having 1 to 4 carbon atoms in the alkyl substituent.

5. The composition of claim 1 wherein the refractory filler is selected from the group consisting of clay, alumina, carbon, magnesia, and pyrophyllites.

6. The composition of claim 1 wherein the wetting agent is selected from the group consisting of ethylene glycol, diethylene glycol, propylene glycol, polyethylene glycol, dioctyl phthalate, and tricresyl phosphate.

* * * * *